Feb. 11, 1941.　　　K. BURKE　　　2,231,614
VALVE
Filed April 4, 1940　　　2 Sheets-Sheet 1
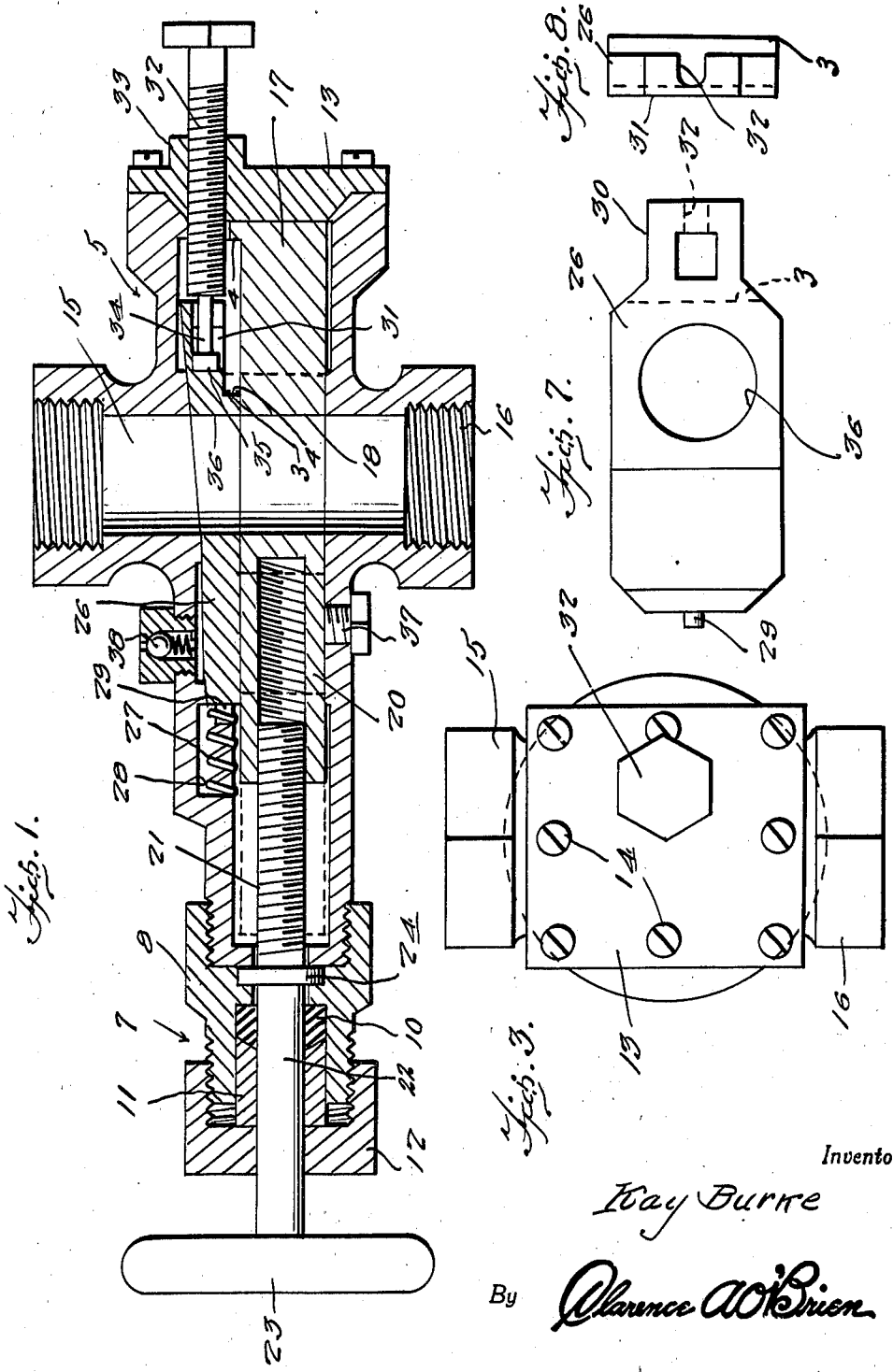
Inventor
Kay Burke
By Clarence A. O'Brien
Attorney

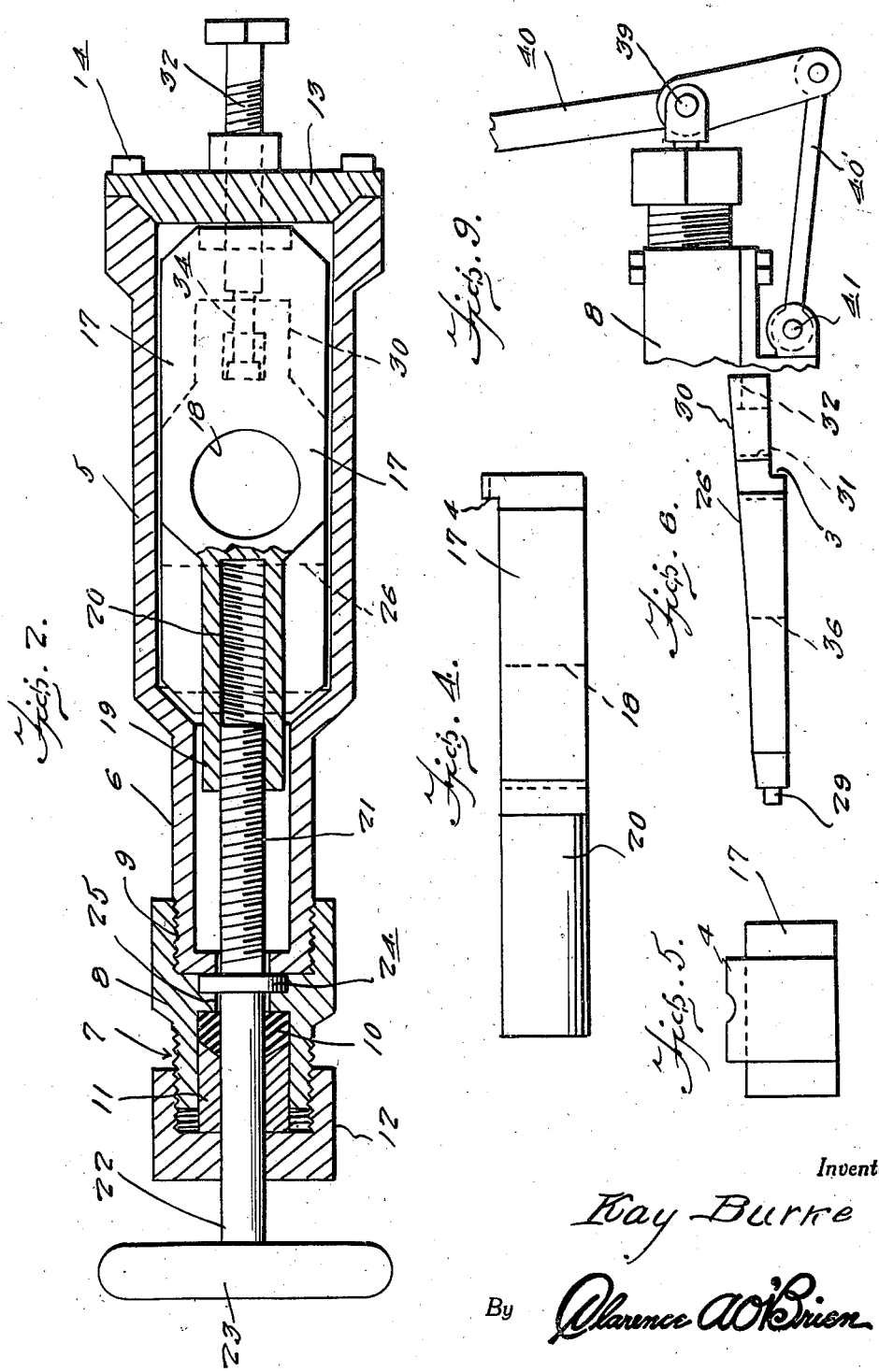

Patented Feb. 11, 1941

2,231,614

UNITED STATES PATENT OFFICE 2,231,614

VALVE

Kay Burke, Weiser, Idaho, assignor of one-half to Paul Stock, Cody, Wyo.

Application April 4, 1940, Serial No. 327,870

3 Claims. (Cl. 251—57)

This invention relates to valves and an object of the invention is to provide a valve for use in pipe lines and similar conduits for controlling the flow of fluid or liquid therethrough; and among the objects of the invention is to provide a valve of this character which will permit of a wide range of adjustment; is substantially self-cleaning, and will at all times be smooth and efficient in operation.

The invention, together with its objects and advantages will be best understood from a study of the following description taken in connection with the accompanying drawings wherein:

Figure 1 is a vertical longitudinal sectional view through the valve.

Figure 2 is a horizontal longitudinal sectional view through the valve.

Figure 3 is an end elevational view of the valve.

Figure 4 is a side elevational view of the sliding gate.

Figure 5 is an end elevational view of the gate.

Figure 6 is a side elevational view of a wedge.

Figure 7 is a top plan view of the wedge.

Figure 8 is an edge elevational view of the wedge, and

Figure 9 is a fragmentary side elevational view at one end of the valve assembly and illustrating a slightly modified form of the same.

Referring more in detail to the drawings it will be seen that in the preferred embodiment thereof the valve comprises a relatively flat, oblong body or casing 5 that at one end merges into a reduced longitudinally extended terminal 6 on which is mounted a bonnet assembly 7.

The bonnet assembly 7 includes a bonnet member 8 that is screw threadedly engaged with the end 6 of the valve casing as at 9 and is provided with a socket in which is located a packing 10 and packing follower 11 retained in the socket of the bonnet through the medium of a gland nut 12 screwthreaded on the bonnet 8 as shown.

At the opposite end thereof the casing is open for the insertion therein or removal therefrom of the internal parts of the valve, and for this open end of the valve casing there is a removable plate 13 secured to the casing through the medium of bolts or other fastening elements 14.

The casing 5 is provided with oppositely disposed ports 15 and 16 that are suitably threaded or otherwise equipped for attachment to the sections of a pipe line or conduit when the valve is interposed therein.

The valve also includes a gate 17 that has a sliding fit in the valve casing 5 and is provided with a through opening 18 for registry with the ports 15 and 16 when the valve case 5 is in a fully open position.

The gate 17 is provided with a substantially cylindrical stem 19 that is internally threaded as at 20 for threaded reception of the threaded end 21 of an operating shank 22 for the valve gate, and which shank 22 at its outer end is equipped with a suitable handle 23.

The stem 22 is journaled in the bonnet assembly 8 as clearly shown in Figure 2 and is provided with a shoulder 24 accommodated between the terminal of the casing end 6 and an internal flange 25 with which the bonnet 8 is equipped as shown in Figure 2 so that while the operating shank 22 is free to rotate it is held against longitudinal movement. Consequently, by rotating the shank 22 in either direction valve gate 17 will be caused to shift in either of two directions longitudinally within the casing 5 to either a fully open or a fully closed position or to any position intermediate the two positions just mentioned, and will be held at the desired position to which it has been moved.

Interposed between the valve gate 17 and a wall of the casing 5 is a wedge 26 that is normally urged in one direction through the medium of a coil spring 27 accommodated within a suitable recess 28 provided in said wall of the casing 5 and having an end impinging against an end of the wedge 6 at a pin-equipped end 29 of the wedge.

At the end thereof opposite to the pin 29 the wedge 26 is provided with a reduced extension 30 that is provided with a recess 31 and a notch 32 opening into the recess at the extremity of the extension 30.

For shifting the wedge 26 in opposition to the spring 27 and for securing the wedge in adjusted position there is provided a feed screw 32 that threads through a boss 33 in the plate 13 and at its inner end is provided with a reduced shank portion 34 that extends through the slot 32 into the recess 31 and terminates in an abutment head 35 that bears against the wedge 26 at the inner end of the recess 30 when the feeding screw 32 is rotated in one direction to shift the wedge 26 in one direction, and against the notched outer end of the extension 34 when the screw 32 is rotated in a reverse direction for shifting the wedge 26 in a direction opposite to that just mentioned.

The wedge 26 is provided with a through opening 36 for alignment with the opening 18 in the valve gate 17 and the ports 15 and 16 whereby when the valve gate 17 and wedge 26 are in the position shown in Figure 1, a through opening for the valve is provided for the passage of water and other fluid or liquid therethrough.

Also in accordance with the present invention the bottom of the valve casing 5 is provided with a removable drain plug 37, while tapped into the top wall of the casing 5 intermediate the recess 28 and port 15 is an inwardly opening spring-pressed ball valve assembly 38 through which oil may be inserted into the valve casing and around the working parts of the valve to reduce friction and insure smooth and efficient operation of the valve.

Also if desired, and for quick operating purposes, the gate operating shank or rod 22 instead of being equipped with the knob 23 as herein previously described may, as shown in Figure 9, be equipped at its outer end with a yoke 39 to which is pivoted an operating lever 14 that at one extremity is pivoted to a link 40' that in turn is pivoted as at 41 to the bonnet 8 or directly to the valve casing, as may be found desirable. Obviously by proper manipulation of lever 14 the gate operating shank or rod 22, and which under such circumstances would be positively secured to the valve gate, said valve gate may be rapidly shifted to an open or closed position, or to any position intermediate said open and closed positions.

It will also be seen that in accordance with the present invention valve gate 17 is provided with a shoulder 4 while wedge 26 is provided with a shoulder 3. It will thus be seen that as gate 17 moves to a closed position, shoulder 4 thereon will engage shoulder 3 of wedge 26 causing the latter to shift with the gate 17 for increasing the wedging action of the wedge 26 to the end that the gate 17 will be positively secured in valve-closing position, thus insuring a complete shut-off of the valve.

In actual practice it will be found that a valve embodying the features of the present invention can be readily and quickly assembled, can be used with facility under any conditions requiring the use of a valve, is practically self cleaning and self seating, and with little care or attention will always be in condition for smooth and efficient operation.

It is thought that a clear understanding of the construction, utility and advantages of an invention of this character will be had without a more detailed description.

Having thus described the invention what is claimed as new is:

1. A valve embodying an elongated casing having oppositely disposed ports, a valve gate having a sliding fit in said casing, and manipulative means for shifting said gate and for securing the latter at the desired position of adjustment within the casing; a locking wedge for the valve gate having a sliding fit in the casing between the gate and a wall of the casing, and manipulative means for shifting the wedge independently of the valve gate and for securing the wedge at the desired position of adjustment, said wedge and said gate, respectively, being provided with apertures for alignment one with the other and with the ports of the valve; and said valve gate and locking wedge being provided with coacting shoulders for transmitting movement of the gate to the wedge when the gate is moved to a closing position for increasing the effective action of the wedge in locking the gate in a valve-closing position.

2. In a valve embodying a casing, a valve gate having a sliding fit in the casing and a locking wedge for the valve having a sliding fit in the casing between the gate and a wall of the casing; manipulative means for shifting said gate and for securing the latter at the desired position of adjustment, manipulative means for shifting the wedge independently of the valve gate and for securing the wedge at the desired position of adjustment; and said wedge and gate being provided with coacting shoulders for transmitting movement of the gate to the wedge for increasing the effective action of the wedge in locking the gate in a valve-closing position.

3. In a valve of the character described, a sliding gate valve, a sliding wedge for said gate valve, said valve gate and locking wedge being provided with coacting shoulders for transmitting movement of the gate to the wedge for increasing the effective action of the wedge in locking the gate in a valve-closing position; manipulative means for said gate and wedge, respectively, for shifting said gate and wedge independently of one another, and a spring device engaged with the wedge and normally urging the latter in one direction relative to the valve gate.

KAY BURKE.